United States Patent
Woerdeman et al.

(10) Patent No.: US 9,040,597 B2
(45) Date of Patent: *May 26, 2015

(54) CONVERSION OF CORN GLUTEN MEAL INTO A SOLID ARTICLE THROUGH THE USE OF A NON-TOXIC ADDITIVE

(75) Inventors: Dara L. Woerdeman, Merion Station, PA (US); Odelia Maron, Philadelphia, PA (US)

(73) Assignee: Green Materials, LLC, Merion Station, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/810,855

(22) PCT Filed: Jul. 19, 2011

(86) PCT No.: PCT/US2011/044483
§ 371 (c)(1),
(2), (4) Date: Mar. 22, 2013

(87) PCT Pub. No.: WO2012/012387
PCT Pub. Date: Jan. 26, 2012

(65) Prior Publication Data
US 2013/0203881 A1    Aug. 8, 2013

Related U.S. Application Data

(60) Provisional application No. 61/365,541, filed on Jul. 19, 2010.

(51) Int. Cl.
*A21D 2/00* (2006.01)
*C08L 89/00* (2006.01)
*C08L 99/00* (2006.01)
*C08H 1/00* (2006.01)

(52) U.S. Cl.
CPC ............. *C08L 89/00* (2013.01); *C08L 99/00* (2013.01); *C08H 1/00* (2013.01)

(58) Field of Classification Search
CPC ..... C08J 9/0004; C08J 2300/16; B29C 67/24; C08L 89/00
USPC .......... 521/79, 109.1, 116; 264/330; 106/124.1; 426/19
See application file for complete search history.

(56) References Cited

U.S. PATENT DOCUMENTS

| | | | |
|---|---|---|---|
| 5,665,152 A * | 9/1997 | Bassi et al. | 106/145.1 |
| 7,520,929 B2 | 4/2009 | Woerdeman et al. | |
| 2005/0101700 A1* | 5/2005 | Riebel | 524/17 |
| 2007/0129467 A1 | 6/2007 | Scheer | |
| 2013/0255537 A1* | 10/2013 | Woerdeman et al. | 106/124.1 |

OTHER PUBLICATIONS

International Search Report mailed Dec. 9, 2011 for International Application No. PCT/US2011/044483.

* cited by examiner

*Primary Examiner* — Nathan M Nutter
(74) *Attorney, Agent, or Firm* — Gordon & Rees LLP

(57) ABSTRACT

Disclosed are fast-curing, inexpensive corn-gluten resin compositions, methods for making them, methods for forming them into solid articles. In some embodiments, the resin composition includes corn meal gluten and a non-toxic organic acid.

17 Claims, 3 Drawing Sheets

Flexural Strength Measurements

Error bars represent one standard deviation.

Flexural Strength Measurements

Error bars represent one standard deviation.

Flexural Modulus Calculations

Error bars represent one standard deviation.

CONVERSION OF CORN GLUTEN MEAL INTO A SOLID ARTICLE THROUGH THE USE OF A NON-TOXIC ADDITIVE

CROSS-REFERENCE TO RELATED APPLICATIONS

This application is a national phase filing under 35 U.S.C. 371 of International Patent Application No. PCT/US2011/044483, filed Jul. 19, 2011, which claims the benefit of U.S. Provisional Application Ser. No. 61/365,541, filed Jul. 19, 2010, entitled "Conversion of Corn Gluten Meal Into a Solid Article Through the Use of a Non-Toxic Additive," each of which is incorporated herein by reference in its entirety.

BACKGROUND OF THE INVENTION

The present invention generally relates to fast-curing, inexpensive corn-gluten polymer compositions, methods for making them, methods for forming them into solid articles.

Decades ago, modern society embraced the use of plastics and other synthetic resins to make items such as disposable utensils, plates, etc. Today, modern society has turned "green", looking for environmentally conscious choices for everything from disposable utensils to the cars we drive. Biofuels are being developed to power those cars, and are becoming increasingly popular with consumers. Similarly, biopolymers are being developed for uses that were previously exclusive to the plastics industry.

These types of biopolymers and resins are made from renewable resources, are biodegradable and have many eco-friendly attributes. Because of this, biopolymers and resins are becoming increasingly more important and popular. However, they must ultimately be able to compete with existing materials on the basis of both performance and cost.

SUMMARY OF THE INVENTION

Some embodiments of the invention provide a resin composition for molding formed articles comprising:
 a resin component itself comprising by weight of the resin component:
  about 70% to about 99% w/w corn meal gluten,
  about 1% to about 18% organic acid, and
  an optional solvent.

Some embodiments of the invention provide that the resin composition further comprises a reinforcement/filler component, the reinforcement/filler component comprising up to about 40% by weight of the resin composition.

Some embodiments of the invention provide for a formed article comprising:
 a resin composition:
 a resin component itself comprising by weight of the resin component:
  about 70% to about 99% w/w corn meal gluten,
  about 1% to about 18% organic acid, and
  an optional solvent.

Some embodiments of the invention provide for a formed article further comprising a reinforcement/filler component, the reinforcement/filler component comprising up to about 40% by weight of the resin composition.

Some embodiments of the invention provide a method for forming an article comprising:
 filling a heated mold with a resin composition described herein;
 applying pressure to the mold;
 optionally releasing the pressure;
 curing the resin composition within the mold to form the article within the mold.

BRIEF DESCRIPTION OF THE DRAWING FIGURES

DETAILED DESCRIPTION OF THE INVENTION

Figure 1:
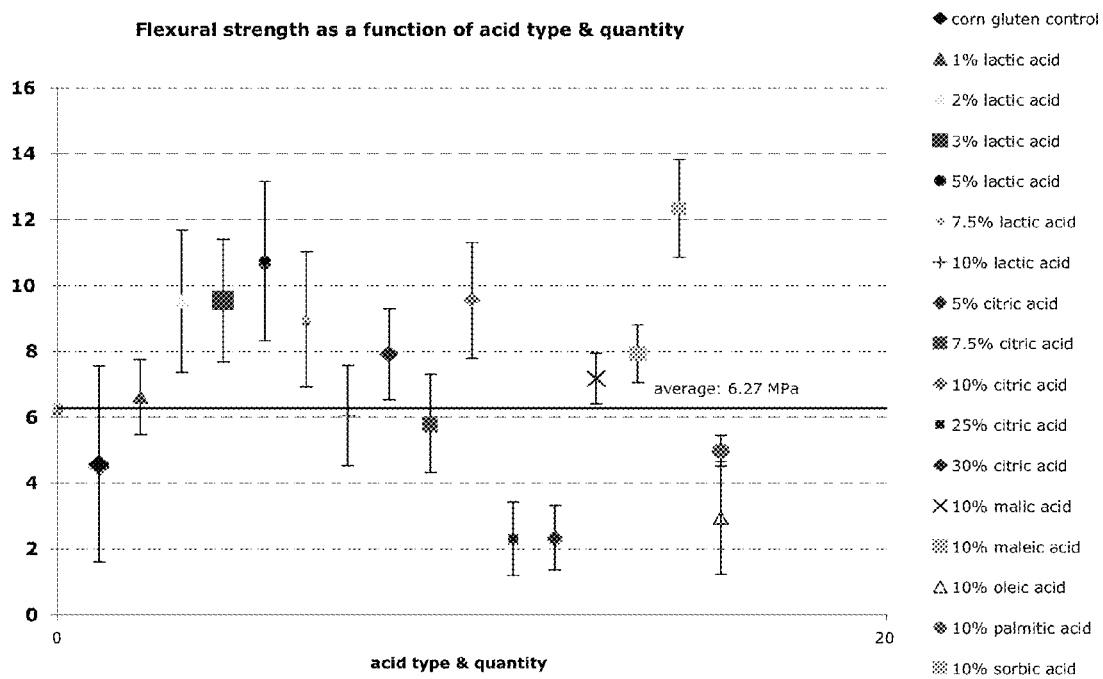
FIG. 1 is a graph depicting the flexural strength data presented in Table 1.
Figure 2:
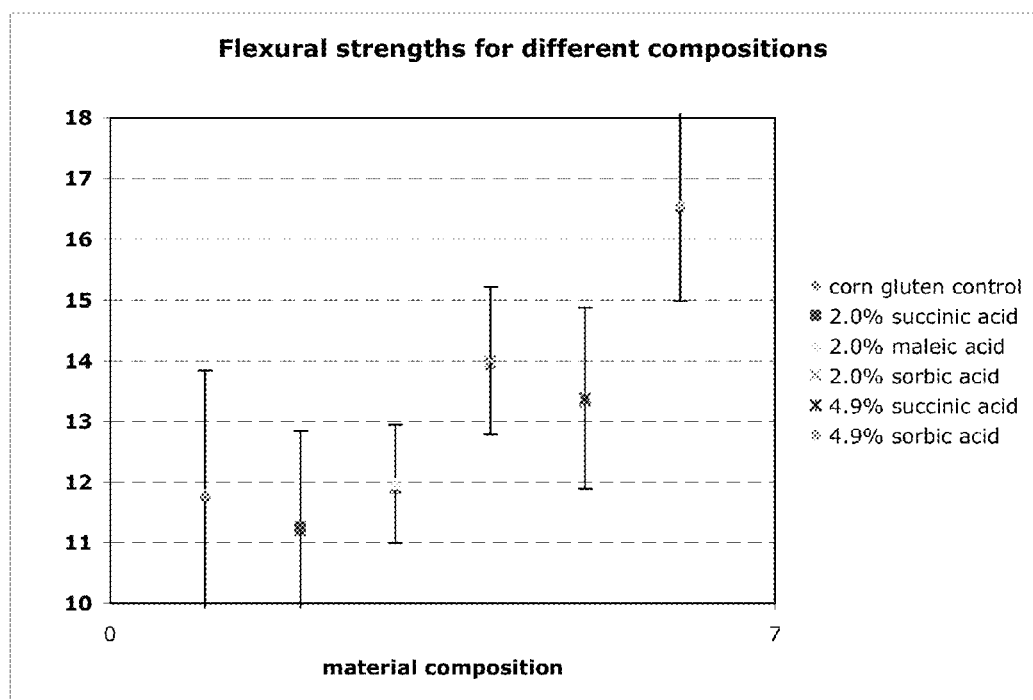
FIG. 2 is a graph depicting the flexural strength data presented in Table 2.
Figure 3:
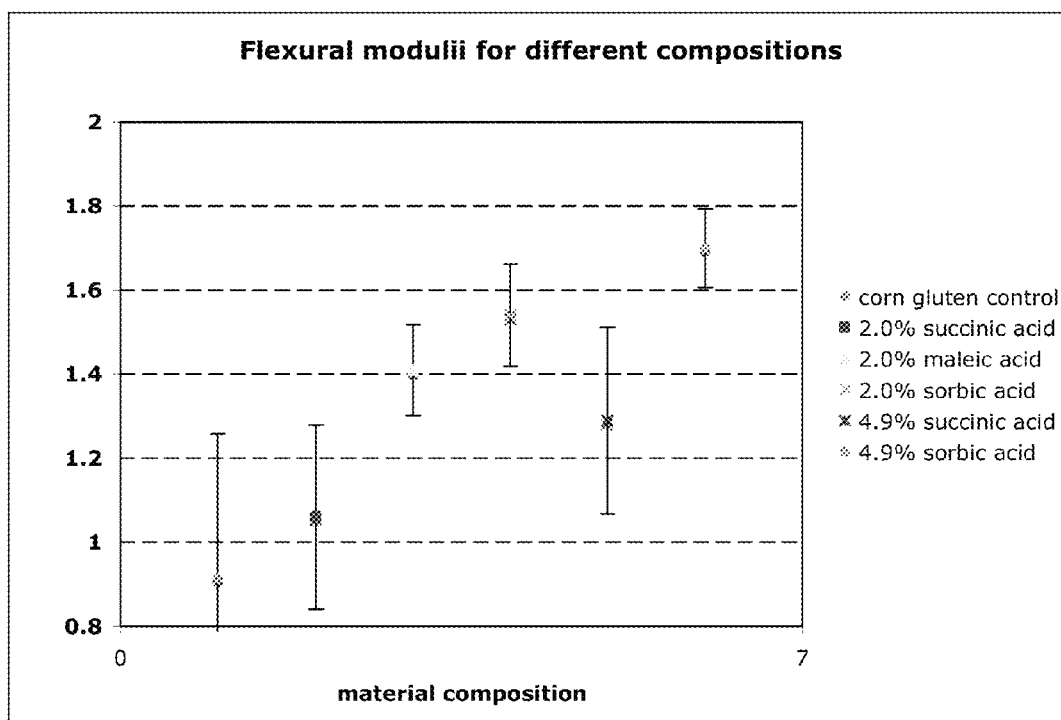
FIG. 3 is a graph depicting the flexural modulus data presented in Table 2.

The present invention generally relates to fast-curing, corn-gluten polymer compositions, suitable for a fast moving production line, methods for making them, methods for forming them into solid, plastic-like objects, and the objects so formed.

"Corn Gluten Meal" as used herein is a byproduct of corn (maize) processing that has historically been used as an animal feed or an animal feed additive. Corn gluten meal is a heterogeneous, unrefined product comprising corn gluten as well as other byproducts of the wet milling process, including but not limited to protein (e.g. glutelins, zein), fiber, starch, corn oil, minerals, and xanthophylls. As a natural product, the precise chemical composition of Corn Gluten Meal may vary from crop to crop and batch to batch. Corn gluten meal is often referred to as "CGM". Corn gluten meal has a relatively high protein content, usually from about 40% to about 60%.

"Corn Gluten" as referred to herein is a protein substance that remains when starch is removed from corn, particularly during the wet milling process. Corn gluten may comprise a mixture of proteins and other substances. We note for clarity that "corn gluten" is not "wheat gluten" and corn gluten does not affect those allergic to wheat gluten or those suffering from Celiac's disease as wheat gluten (often referred to simply as gluten). In some contexts, "corn gluten" and "corn gluten meal" are synonymous. As used herein, "corn gluten" is synonymous with "corn gluten meal."

Reference to corn gluten meal herein is meant to convey the relatively unrefined product. It is contemplated that further refinements of the corn gluten meal may yield corn gluten, particular components of corn gluten, corn zein, and other refined products. These products may also be useful in the preparation of formed articles and as plastic substitutes. In fact those of skill in the art will recognize that the use of such materials has been discussed. The invention herein involves the use of significantly less expensive corn gluten meal.

As described herein, corn gluten meal can be made into a resin-like material that may be shaped and formed into articles traditionally formed of plastics. For example, disposable (or more to the point, compostable or biodegradable) eating utensils can be made with the compositions and techniques described herein.

As we know from corn bread, corn gluten meal by itself (or hydrated) does not readily exhibit cohesive properties like vital wheat gluten. In the cooking setting, some kind of binder is used to achieve the desired cohesiveness, such as eggs or small amounts of wheat flour. In the industrial setting, significant pressures and temperatures are usually required to soften corn gluten to achieve molecular-scale interpenetration among the individual protein molecules.

The corn gluten meal based compositions described herein can be molded into solid, plastic-like articles at low pressures, such as the pressure generated by the weight of a 10 cm×10 cm stainless steel plate or about 820 g.

Some formulations described herein comprise corn gluten meal and a relatively small amount of non-toxic, organic acid (e.g. about 15% by weight or less). These formulations can be molded in a single step, into a solid article without having to subject it to high shear forces or pressures. Accordingly, less energy-intensive processing methods, such as vacuum forming or stamping may be used in forming the objects.

Suitable non-toxic organic acids will have cross-linking ability or will have the ability to initiate crosslinking between other molecules in the material. Some acids behave more effectively as chemical crosslinkers (or as chemical-crosslinking agents), while others behave more effectively as plasticizers (e.g. long-chained, fatty acids). Those of skill in the art will recognize long lists of candidate plasticizers (such as fatty acids, polyhydric alcohols, etc), that do not function as chemical crosslinkers. Those of skill in the art will also recognize candidate crosslinkers (e.g. aldehydes) which are toxic and/or inappropriate for use with the relatively crude corn meal, as opposed to more refined corn proteins such as zein. Although any suitable non-toxic organic acid can be used, for manufacturing and cost concerns several inexpensive organic acids are widely available and useful on an industrial scale. Similarly, those of skill in the art will recognize candidate crosslinkers many of which are expensive and typically used to fix biological tissues (e.g. genepin or carbodiimide) and/or are inappropriate for use with the relatively crude corn meal. Suitable non-toxic and inexpensive organic acids include, but are not limited to, $C_1$-$C_8$alkyl substituted with 1-3 —OH groups and 1-3 —CO(OH) groups, $C_1$-$C_6$alkenyl substituted with 1-3 —CO(OH) groups). The $C_1$-$C_8$alkyl based organic acids (with one or more —CO(OH) groups include but are not limited to lactic acid, citric acid propionic acid, succinic acid, malic acid, malonic acid, valeric acid, tartaric acid, gluconic acid, and caproic acid. The $C_1$-$C_6$alkenyl based acids include one or more double bond and include but are not limited to maleic acid, sorbic acid, angelic acid, tiglic acid. Some embodiments use $C_3$-$C_6$alkyl substituted with 1-3 —OH groups and 1-3 —CO(OH) groups. In still other embodiments, $C_3$ alkyl substituted with 1-3 —OH groups and 1-3 —CO(OH) groups are used. Some embodiments use $C_3$-$C_6$alkenyl substituted with 1-3 —CO(OH) groups). We believe that some heterocyclic acids could work as well and include but are not limited to uric acid, ascorbic acid, benzoic acid, and salicylic acid. There are also volatile acids that could be toxic at high concentrations, such as acetic acid or oxalic acid, but could potentially promote crosslinking at low concentrations. It may also be useful to use some of these acids in combination with each other (e.g. sorbic acid and lactic acid).

It has been discovered that, in particular, lactic acid, sorbic acid, and citric acid appear to be very promising. Two of these molecules have at least one carboxylic acid group and one alcohol group and one molecule has at least one carboxylic acid group and one double bond. Thus, we believe suitable non-toxic organic acids include those having at least one carboxylic acid group and one alcohol group or at least one carboxylic acid group and one double bond.

As described below, it has been discovered that some acids are more effective than others in their effect on flexural strength, an important property in "plastic" articles. Importantly, it has been discovered that unlike the acids mentioned above fatty acids do not appear to impart the desired characteristics to the formed article. In fact, when 10% oleic acid was added, it actually reduced flexural strength compared to corn gluten meal alone (the control). The non-toxic, organic acids can be added in an amount of less than about 18% by weight of the composition. However, if these acids are added in excess (e.g. 25% or 30% citric acid), they can also reduce the flexural strength compared to corn gluten meal alone. Above these levels, the excess acid can behave more like a plasticizer, which is traditionally used at these higher levels (about 20% to about 30%). In some embodiments, the non-toxic organic acids can be present in an amount from about 0.5% to about 18% by weight of the composition. In some embodiments, the non-toxic organic acid is present below about 15% by weight of the composition. In some embodiments, the non-toxic organic acid is present below about 10% by weight of the composition. In some embodiments, the non-toxic organic acid is present at about 1% to about 10%. In some embodiments, the non-toxic organic acid is present at about 5% to about 7.5% by weight of the composition.

Corn gluten meal can be in powder or pellet form or formed into a dough. Although the pelletized form may be used, in some instances, it is first ground into a powder for improved handling and function. When mixed with a suitable amount of a non-toxic, organic acid and placed in a heated mold and compressed under nominal load, a solid article is formed.

Thermosetting reactions usually occur at low pressures, and typically involve the formation of covalent bonds. In thermoplastic processing, however, chemical bonds are not necessarily formed; typically, the polymer chains entangle with each other under high heat and pressure, yielding a solid plastic article. Process aids are often added to facilitate the formation of a polymer melt. However, if the process aids are not correctly selected, the strength of the final part could be adversely affected. The correctly selected process aid also promotes retention of molded shape, and promotes durability while still allowing biodegradation. Balance between short-term use and durability, and longer-term biodegradability is critical.

The curable formulations disclosed herein are different from these thermoplastic formulations described in the scientific literature in the following ways:

Much lower quantities (10% or less) of certain additives is all that is needed in the mixture to achieve a fast-curing, "vacuum-formable", corn gluten meal based plastic. This is clearly a delicate process, as a number of parameters appear to be important, such as solubility, number of functional groups (e.g. carboxylic acid groups, alcohol groups, double bonds, etc.), polarity, etc. In certain cases, the additive could serve multiple functions; e.g. as both a process aid and a curing agent, or as both a curing agent and a preservative, or as a process aid, curing agent, and a preservative.

In accordance with some embodiments of the invention, a resin composition is made from corn meal gluten and a non-toxic organic acid. In some embodiments, the resin composition comprises:
 a resin component comprising:
  about 70% to about 99% corn meal gluten by weight of the resin component;
  about 1% to about 18% non-toxic organic acid; and
  an optional solvent.

The solvent may be water or other benign solvent such as but not limited to propylene glycol, glycerol, etc. The addition of solvent aids in creating a flowable resin that may be poured into a mold.

In some embodiments, the ratio of corn meal gluten to non-toxic organic acid is about 99:1; about 98:2; about 97:3; about 95:5; about 92.5:7.5; about 90:10; and about 87.5:12.5; and range between any of those.

One or more environmentally-friendly reinforcement or filler materials may optionally be used in the compositions and methods described herein. Such reinforcement or filler materials include but are not limited to natural fibers, sawdust, inorganic fibers, foaming agents, clays, zeolites, and combinations thereof.) Such optional fillers are contemplated as high as 30 to 40% w/w of the composition, based upon desired conditions such manufacturing concerns, wetness, strength, interfacial properties between polymer and the filler, etc. In some embodiments the reinforcement or filler materials are added to the resin component at a ratio of up to about 40% reinforcement/filler material to 60% resin component by weight of the total resin composition. In some embodiments, the ratio of reinforcement/filler material to resin component is about 30:70; about 25:75; about 10:90, and ranges between any two of these.

To form a desired article, the starting materials are mixed, in the amounts described above, having about 70% to about 99% corn gluten meal and about 1% to about 18% non-toxic organic acid, as described above. Water and/or another benign solvent (e.g. propylene glycol, glycerol, etc.) may be added to aid in mixing and to create a viscous, pourable liquid, which aids in filling the forms.

Once mixed, an appropriate amount is placed in a heated mold. A balance must be achieved employing adequate heat in order to promote crosslinking, but not so much heat that the material thermally decomposes. Typically this is about 180° F. to about 350° F., but can be adjusted based on the components used and conditions. An initial load of nominal pressure (e.g. approximately 3-5 MPa) is applied to compress the starting material, which minimizes voids within the mold. The applied load may then be released and the material allowed to cure within the heated mold for about 20 minutes, bearing the weight of just the top cover plate (e.g. 0.084 MPa). The mold is allowed to cool to room temperature, and the articles are then removed. The load applied and the cure time will vary depending upon the exact formulation used, the size of the mold, the size of the molded article, the number of molded articles, etc. Alternatively, the material may be processed under applied loads (e.g. approximately 4-5 MPa for 10 minutes) to facilitate mixing and the formation of both chain entanglements and crosslinks in the material.

Any type of molded article may be produced in a similar manner. It is particularly contemplated that the formulations and methods described herein are well suited to the production of disposable (compostable, biodegradable) eating and/or serving utensils. For that matter, plates, serving dishes, containers, clamshells or any other formed article may be made via similar techniques.

It is also contemplated that the corn gluten meal formulations described herein, could be used as a degradable binder for application of certain filler materials. For example the corn gluten meal formulation could be made to bind insulative fibers into a form for ease of installation. Once installed, the corn gluten meal formulation would degrade, leaving behind only the insulative materials.

Those of skill in the art will readily recognize that other additives can also be used. For example, one or more preservatives, colorants, texturizers, etc. can be used depending upon the desired application. One of skill in the art will readily recognize that additional additives can be employed to alter odor, appearance, shelf-life, degradation characteristics, durability, cost, etc.

EXPERIMENTAL PROTOCOL AND EXAMPLES

Material Preparation (Series 1)

Corn gluten meal is available in both pellet form and powder form. In this particular series of experiments, pellets were used. The pellets were ground to a fine powder in order to achieve a more uniform blend.

Example 1

Control: 65 g corn gluten meal (97% corn gluten meal, 3% molasses pellet binder; purchased from Uhler's, Malvern, Pa.) were placed in a 10 cm×10 cm stainless steel mold.

Example 2

180 g of citric acid were dissolved in 20 mL de-ionized water and heated for 40 sec in a microwave. The contents were then poured into a food processor mixing chamber, along with 100 g ground corn gluten meal and pulse-mixed for 1 min (The food processor is equipped with a metal blade.) The mixture was poured into a glass beaker and heated again for 45 sec, and afterwards was mixed with another 80 g of ground corn gluten meal. The citric acid-modified corn gluten meal was kept in pellet form and stored in a sealed bag in the freezer until use. This procedure yielded a 50:50 (w/w) citric acid/corn gluten meal composition.

Example 3

Mixed 16.25 g of the citric acid-modified corn gluten meal blend prepared in Example 2 with 48.75 g corn gluten meal, yielding a material comprising approximately 87.5% corn gluten meal and 12.5% (w/w) citric acid.

Example 4

Mixed 13 g of the citric acid-modified corn gluten meal blend prepared in Example 2 with 52 g corn gluten meal, yielding a material comprising approximately 90% (w/w) corn gluten meal and 10% (w/w) citric acid.

Example 5

Mixed 9.75 g of the citric acid-modified corn gluten meal blend prepared in Example 2 with 55.25 g corn gluten meal, yielding a material comprising approximately 92.5% (w/w) corn gluten meal and 7.5% (w/w) citric acid.

Example 6

Mixed 6.5 g of the citric acid-modified corn gluten meal blend prepared in Example 2 with 58.5 g corn gluten meal, yielding a material comprising approximately 95% (w/w) corn gluten meal and 5% (w/w) citric acid.

Example 7

Mixed 6.5 g lactic acid with 58.5 g corn gluten meal, yielding a material comprising approximately 90% (w/w) corn gluten meal and 10% (w/w) lactic acid.

Example 8

Mixed 6.5 g lactic acid with 58.5 g corn gluten meal, yielding a material comprising approximately 90% (w/w) corn gluten meal and 10% (w/w) lactic acid.

Example 9

Mixed 6.5 g oleic acid with 58.5 g corn gluten meal, yielding a material comprising approximately 90% (w/w) corn gluten meal and 10% (w/w) oleic acid.

Example 10

Mixed 3.25 g lactic acid with 61.75 g corn gluten meal, yielding a material comprising approximately 95% (w/w) corn gluten meal and 5% (w/w) lactic acid.

Example 11

Mixed 4.87 g lactic acid with 60.13 g corn gluten meal, yielding a material comprising approximately 92.5% (w/w) corn gluten meal and 7.5% (w/w) lactic acid.

Example 12

Mixed 6.5 g palmitic acid with 58.5 g corn gluten meal, yielding a material comprising approximately 90% (w/w) corn gluten meal and 10% (w/w) palmitic acid.

Example 13

Mixed 6.5 g sorbic acid with 58.5 g corn gluten meal, yielding a material comprising approximately 90% (w/w) corn gluten meal and 10% (w/w) sorbic acid.

Example 14

Mixed 6.5 g maleic acid with 58.5 g corn gluten meal, yielding a material comprising approximately 90% (w/w) corn gluten meal and 10% (w/w) maleic acid.

Example 15

Mixed 6.5 g malic acid with 58.5 g corn gluten meal, yielding a material comprising approximately 90% (w/w) corn gluten meal and 10% (w/w) malic acid.

Example 16

Mixed 1.95 g lactic acid with 63.05 g corn gluten meal, yielding a material comprising approximately 97% (w/w) corn gluten meal and 3% (w/w) lactic acid.

Example 17

Mixed 1.3 g lactic acid with 63.7 g corn gluten meal, yielding a material comprising approximately 98% (w/w) corn gluten meal and 2% (w/w) lactic acid.

Example 18

Mixed 0.65 g lactic acid with 64.35 g corn gluten meal, yielding a material comprising approximately 99% (w/w) corn gluten meal and 1% (w/w) lactic acid.

Specimen Preparation (Series 1):

All plaques were compression molded using a Carver press (Carver, model #3851-0). The starting material was placed in a stainless steel mold (10 cm×10 cm×0.4 cm). The mold was placed in the press. (The temperature of the platens was set at 290 F.) An initial load of approximately 3 to 5 MPa was applied in order to compress the starting material and minimize voids within the mold. The applied load was then released and the material was allowed to cure within the heated mold for 20 minutes, bearing the weight of just the top cover plate (0.084 MPa). In this series of experiments, the application of load was kept low intentionally in order to avoid masking the effect of the organic acid. The plaques were demolded after the mold had cooled down to room temperature. All of the plaques in this series of experiments were molded within the same 10-day period.

Mechanical Testing: Flexural Strength (Series 1)

Plaques were cut into test specimens using a table saw to strips of 1.1-1.5 cm in width and 9.5-10.0 cm in length. The test specimens were conditioned at 70% humidity and 70° F. for 24 hours prior to testing. Flexural tests were conducted using an Instron model 1125 in accordance with modified ASTM D790 flexural test. The gauge length was set at 62 mm and the crosshead speed was 10 mm/min.

Table 1 below shows average flexural strength in the exemplary samples of series 1. FIG. 1 is a graphical representation of the data.

TABLE 1

| Formulation | Average Flexural Strength (MPa) | Standard Deviation (MPa) | Sample size (n) |
| --- | --- | --- | --- |
| corn gluten control | 4.576 | 2.98 | 30 |
| 1% (w/w) lactic acid | 6.610 | 1.14 | 4 |
| 2% (w/w) lactic acid | 9.522 | 2.16 | 6 |
| 3% (w/w) lactic acid | 9.549 | 1.86 | 6 |
| 5% (w/w) lactic acid | 11.79 | 2.42 | 11 |
| 7.5% (w/w) lactic acid | 8.972 | 2.05 | 6 |
| 10% (w/w) lactic acid | 6.044 | 1.52 | 6 |
| 5% (w/w) citric acid | 7.920 | 1.38 | 6 |
| 7.5% (w/w) citric acid | 5.816 | 1.49 | 5 |
| 10% (w/w) citric acid | 9.550 | 1.76 | 5 |
| 25% (w/w) citric acid | 2.310 | 1.11 | 27 |
| 30% (w/w) citric acid | 2.344 | 0.980 | 4 |
| 10% (w/w) malic acid | 7.177 | 0.771 | 6 |
| 10% (w/w) maleic acid | 7.925 | 0.877 | 10 |
| 10% (w/w) oleic acid | 2.942 | 1.712 | 6 |
| 10% (w/w) palmitic acid | 4.982 | 0.467 | 4 |
| 10% (w/w) sorbic acid | 12.34 | 1.49 | 6 |

As described above, and evident from the above table, each acid interacts with corn gluten meal proteins differently, and in contrast to prior art teachings, organic acids do not appear to be readily interchangeable.

Corn gluten specimens that contained lactic acid [1-7.5% w/w] and sorbic acid [10% w/w] appeared to out-perform all the others in terms of flexural strength. Without being bound by the theory, the inventors believe this may be due to the effect of these acids in promoting the formation of chemical bonds in the material. That is, these acids appear to aid in the forming of chemical crosslinking bonds.

Specimens containing 10% or less organic acid (lactic acid, citric acid, malic acid, maleic acid, or sorbic acid) clearly out-performed specimens containing fatty acid (oleic acid or palmitic acid): flexural strengths of the specimens containing 10% fatty acid were all below average, while the flexural strengths of the specimens containing 10% or less organic acid being at least average or above average Applicants believe, as noted by at least one observer, (Padua et al.), that long fatty acid chains form physical bonds with the protein chains, not chemical bonds. These physical bonds are not chemical cross-linking bonds believed to be present in the organic acid based formulations. Similarly excess (citric) acid (25% or 30% w/w citric acid) appears to behave more like a plasticizer than a crosslinker, which may be why the specimens containing excess organic acid (25% or 30% w/w citric acid) performed well below the grand average of modified and unmodified specimens.

Specimens containing 5% (w/w) lactic acid and 10% (w/w) sorbic acid yielded highest strengths on average.

Average flexural strength of unmodified corn gluten meal specimens was well below the grand average (4.58 MPa) of modified and unmodified specimens, thus indicating that the addition of non-toxic organic acid at about 10% or less had significant effect on the flexural strength of the product formed through heat with nominal pressure.

Material Preparation (Series 2)

Example 19

Control: 65.00 g corn gluten meal (97% corn gluten meal, 3% molasses pellet binder; purchased from Uhler's, Malvern, Pa.) were placed in a 10 cm×10 cm stainless steel mold.

Example 20

Mixed 1.30 g succinic acid with 63.70 g corn gluten meal, yielding a material comprising approximately 98% (w/w) corn gluten meal and 2.0% (w/w) succinic acid.

Example 21

Mixed 3.25 g sorbic acid with 62.75 g corn gluten meal, yielding a material comprising approximately 98% (w/w) corn gluten meal and 4.9% (w/w) sorbic acid.

Example 22

Mixed 1.30 g maleic acid with 63.70 g corn gluten meal, yielding a material comprising approximately 98% (w/w) corn gluten meal and 2.0% (w/w) maleic acid.

Example 23

Mixed 1.30 g sorbic acid with 63.70 g corn gluten meal, yielding a material comprising approximately 98% (w/w) corn gluten meal and 2.0% (w/w) sorbic acid.

Example 24

Mixed 3.25 g succinic acid with 62.75 g corn gluten meal, yielding a material comprising approximately 98% (w/w) corn gluten meal and 4.9% (w/w) succinic acid.

Specimen Preparation (Series 2):

All plaques were compression molded using a Carver press (Carver, model #3851-0). The starting material was placed in a stainless steel mold (10 cm×10 cm×0.4 cm). The mold was placed in the press. (The temperature of the platens was set at 290 F.) A load of approximately 4 to 5 MPa was applied to the material for 10 minutes. The plaques were demolded after the mold had cooled down to room temperature. All of the plaques in this series of experiments were molded within the same 4-day period.

Mechanical Testing: Flexural Strength (Series 2)

Plaques were cut into test specimens using a table saw to strips of 1.1-1.5 cm in width and 9.5-10.0 cm in length. The test specimens were conditioned at 70% humidity and 70° F. for 24 hours prior to testing. Flexural tests were conducted using an Instron model 1125 in accordance with modified ASTM D790 flexural test. The gauge length was set at 62 mm and the crosshead speed was 10 mm/min

TABLE 2

| Formulation | Average Flexural Strength (MPa) | Standard Deviation (MPa) | Avg Flexural Modulus (GPa) | Standard Deviation (GPa) | Sample size (n) | Average Density |
|---|---|---|---|---|---|---|
| corn gluten control | 11.78 | 2.06 | 0.914 | 0.345 | 7 | 1.25 |
| 2.0% (w/w) succinic acid | 11.26 | 1.58 | 1.06 | 0.219 | 8 | 1.25 |
| 2.0% (w/w) maleic acid | 11.97 | 0.978 | 1.41 | 0.108 | 13 | 1.26 |
| 2.0% (w/w) sorbic acid | 14.00 | 1.21 | 1.54 | 0.122 | 7 | 1.26 |
| 4.9% (w/w) succinic acid | 13.38 | 1.49 | 1.29 | 0.222 | 7 | 1.25 |
| 4.9% (w/w) sorbic acid | 16.56 | 1.58 | 1.70 | 0.0938 | 7 | 1.26 |

Specimens containing 5% (w/w) sorbic acid yielded highest strengths and modulii on average in both sets of experiments (Series 1 & 2). The higher strength and modulus of the specimens containing sorbic acid suggests that the crosslinking was enhanced by the sorbic acid. Swelling tests were also conducted to investigate material crosslinking Two 10 cm×10 cm plaques prepared according to Examples 19 and 24 (corn gluten control and 4.9% (w/w) sorbic acid-modified corn gluten). The plaques were then immersed in water for 20 h at room temperature. After 20 h in water, the weight of the corn gluten control specimen had increased by 48.0%, and was accompanied by visible cracking, while the weight of the 4.9% (w/w) sorbic acid-modified corn gluten specimen had increased by only 35.8% and no cracking was evidenced. This result further suggests that the presence of sorbic acid in the material enhances crosslinking, and the absence of cracking suggests an enhanced toughness.

The description herein is meant to be illustrative of the invention and is not intended to limit the invention. Those of skill in the art will readily recognize variants and applications of the experiment that are within the scope and spirit of the description herein and are deemed to be part of the invention disclosed herein.

What is claimed is:

1. A resin composition for molding formed articles with crosslinked corn meal gluten, the composition comprising:
   a resin component itself consisting of:
   about 87.5% to about 99% w/w corn meal gluten,
   about 1% to about 12.5% non-toxic, crosslinking organic acid, and an optional solvent.

2. The resin composition of claim 1 further comprising a reinforcement filler component, the reinforcement filler component comprising up to about 40% by weight of the resin composition.

3. The composition of claim 1, wherein the organic acid is selected from lactic acid, citric acid, sorbic acid, malic acid, succinic acid, and maleic acid.

4. The resin composition of claim 1, wherein the corn meal gluten comprises at least about 98% corn meal gluten by weight of the resin component.

5. The resin composition of claim 1, wherein the corn meal gluten comprises at least about 97% corn meal gluten by weight of the resin component.

6. The resin composition of claim 1, wherein the corn meal gluten comprises at least about 92.5% corn meal gluten by weight of the resin component.

7. The resin composition of claim 1, wherein the corn meal gluten comprises at least about 90% corn meal gluten by weight of the resin component.

8. The composition of claim 2, wherein said reinforcement filler component is selected from natural fibers, sawdust, inorganic fibers, inorganic particles, foaming agents, clays, zeolites, and combinations thereof.

9. A fast-cured, crosslinked corn meal gluten article formed at low pressures from a resin composition comprising:
   a resin component itself consisting of:
   about 87.5% to about 99% w/w chemically crosslinked corn meal gluten, and
   about 1% to about 12.5% non-toxic chemical crosslinker wherein the chemical crosslinker is an organic acid
   wherein the article is formed within about 20 minutes at temperatures between about 180 F to about 350 F and under pressures between about 3 to about 5 MPa.

10. The formed article of claim 9, further comprising a reinforcement filler component, the reinforcement filler component comprising up to about 40% by weight of the resin composition.

11. The formed article of claim 9, wherein the organic acid is selected from lactic acid, citric acid, sorbic acid, malic acid, succinic acid, and maleic acid.

12. The formed article of claim 9, wherein the corn meal gluten comprises at least about 98% corn meal gluten by weight of the resin component.

13. The formed article of claim 9, comprising at least about 97% corn meal gluten by weight of the resin component.

14. The formed article of claim 9, comprising at least about 92.5% corn meal gluten by weight of the resin component.

15. The formed article of claim 9, comprising at least about 90% corn meal gluten by weight of the resin component.

16. The formed article of claim 10, wherein said reinforcement filler component is selected from natural fibers, sawdust, inorganic fibers, inorganic particles, foaming agents, clays, zeolites, and combinations thereof.

17. A method for forming a fast-cured article with chemically crosslinked corn meal gluten comprising the steps of:
   filling a mold heated to between about 180 F to about 350 F with a resin composition according to claim 1;
   applying pressure to the mold between about 3 to about 5 MPa; and
   curing the resin composition within the mold for about 10 to about 20 minutes to form the article with chemically crosslinked corn meal gluten within the mold.

* * * * *